(12) United States Patent
Furusawa et al.

(10) Patent No.: US 8,479,964 B2
(45) Date of Patent: Jul. 9, 2013

(54) DUST COLLECTING DEVICES

(75) Inventors: Masanori Furusawa, Anjo (JP); Takuro Konishi, Anjo (JP)

(73) Assignee: Makita Corporation, Anjo-shi (JP)

( * ) Notice: Subject to any disclaimer, the term of this patent is extended or adjusted under 35 U.S.C. 154(b) by 673 days.

(21) Appl. No.: 12/753,997

(22) Filed: Apr. 5, 2010

(65) Prior Publication Data

US 2011/0239398 A1   Oct. 6, 2011

(51) Int. Cl.
*B25C 1/12* (2006.01)
*B25C 1/14* (2006.01)

(52) U.S. Cl.
USPC ............. 227/10; 227/9; 227/130; 123/46 SC; 173/47; 173/48

(58) Field of Classification Search
USPC .............. 173/75, 171, 197, 198, 217, 76, 77, 173/78, 79, 47, 162.2, 48; 175/209, 211; 408/58, 67; 227/10, 9, 130; 123/46 SC; 81/475
See application file for complete search history.

(56) References Cited

U.S. PATENT DOCUMENTS

| | | | | |
|---|---|---|---|---|
| 4,403,722 A | * | 9/1983 | Nikolich | 227/8 |
| 4,483,473 A | * | 11/1984 | Wagdy | 227/8 |
| 4,483,474 A | * | 11/1984 | Nikolich | 227/8 |
| 4,552,162 A | * | 11/1985 | Finger | 134/57 R |
| 5,113,951 A | * | 5/1992 | Houben et al. | 173/75 |
| 5,263,439 A | * | 11/1993 | Doherty et al. | 123/46 SC |
| 5,356,245 A | * | 10/1994 | Hosoi et al. | 408/56 |
| 5,919,010 A | * | 7/1999 | Fonseca | 408/67 |
| 6,464,018 B1 | * | 10/2002 | Uhl | 173/162.2 |
| 6,615,930 B2 | | 9/2003 | Bongers-Ambrosius et al. | |
| 6,951,439 B2 | | 10/2005 | Arich | |
| 6,971,455 B2 | * | 12/2005 | Shibata et al. | 173/48 |
| 7,168,603 B1 | * | 1/2007 | Lund et al. | 227/10 |
| 7,182,150 B2 | | 2/2007 | Grossman | |
| 7,243,829 B2 | * | 7/2007 | Oda et al. | 227/9 |
| 7,281,886 B2 | | 10/2007 | Stoerig | |
| 7,322,427 B2 | * | 1/2008 | Shimma et al. | 173/48 |
| 7,669,507 B2 | * | 3/2010 | Furusawa et al. | 81/475 |
| 8,186,453 B2 | * | 5/2012 | Furusawa et al. | 173/197 |
| 8,191,648 B2 | * | 6/2012 | Watanabe et al. | 173/20 |
| 8,267,191 B2 | * | 9/2012 | Furusawa et al. | 173/110 |
| 8,286,724 B2 | * | 10/2012 | Furusawa et al. | 173/47 |
| 2002/0056715 A1 | | 5/2002 | Fujita et al. | |
| 2007/0000791 A1 | | 1/2007 | Arai et al. | |

FOREIGN PATENT DOCUMENTS

| | | |
|---|---|---|
| JP | A-08-131382 | 5/1996 |
| JP | A-2002-224631 | 8/2002 |
| JP | A-2002-307332 | 10/2002 |
| JP | A-2004-195565 | 7/2004 |

* cited by examiner

*Primary Examiner* — Chi Q Nguyen
(74) *Attorney, Agent, or Firm* — Oliff & Berridge, PLC

(57) ABSTRACT

One aspect according to the present invention includes a fuel cell battery system including a fuel cell battery assembly and a fuel gas tank. A suction device is driven by a motor and capable of producing flow of air for collecting dust. The motor can receive the supply of power from the fuel cell battery assembly. The fuel cell battery system, the motor and the suction device are assembled within a case.

17 Claims, 13 Drawing Sheets

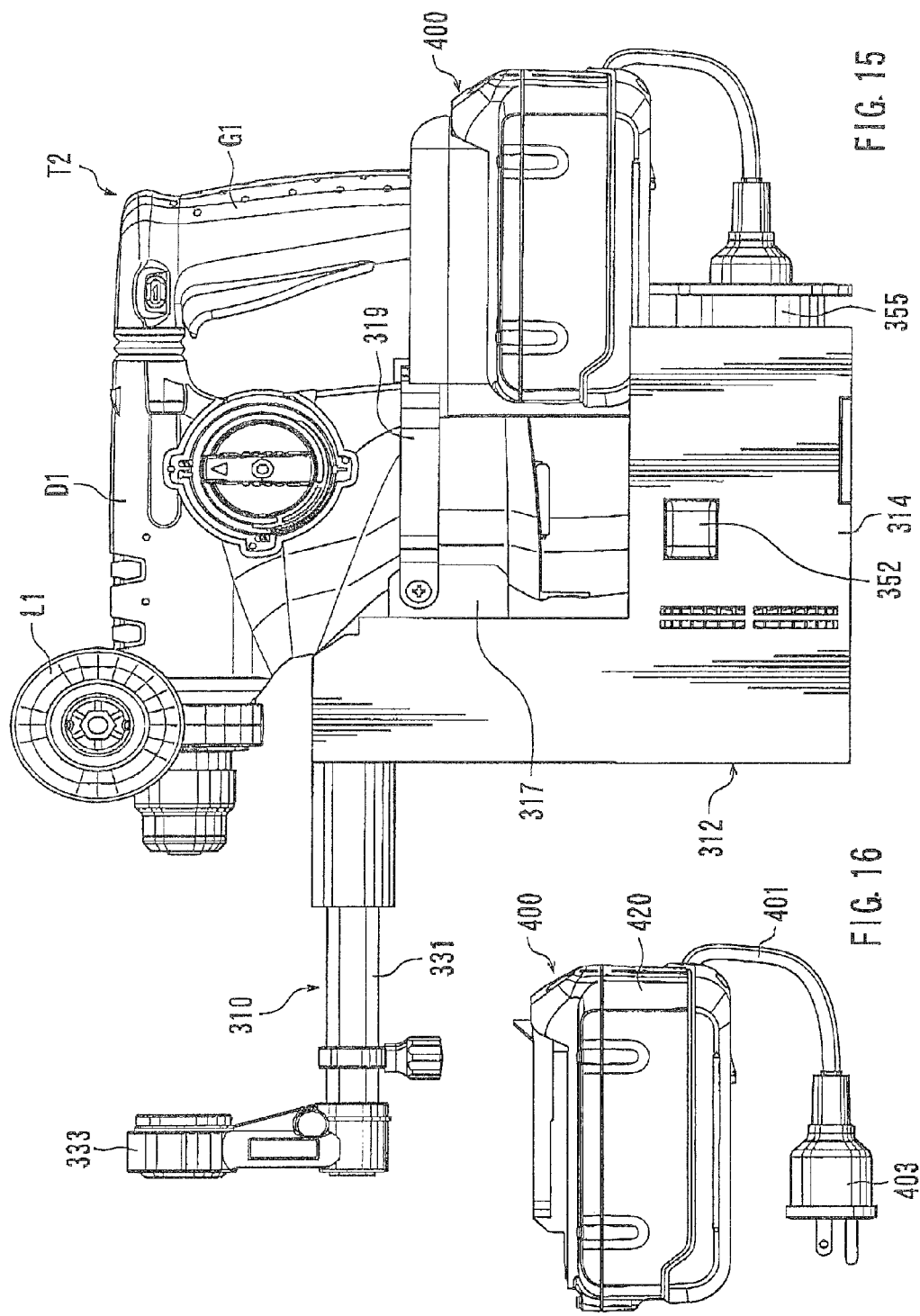

DUST COLLECTING DEVICES

BACKGROUND OF THE INVENTION

1. Field of the Invention

The present invention relates to dust collecting devices, and in particular to dust collecting devices used for power tools, such as circular saws, drills and hammers driven by motors.

2. Description of the Related Art

Motor-driven dust collecting devices having motors (AC or DC motors) and used for power tools are known. The motors serve as drive devices for driving fans, blowers or the like that can produce a flow of air for collecting dust.

Japanese Laid-Open Patent Publication No. 2004-195565 discloses dust collecting devices having motors driven by a commercial AC power source or rechargeable batteries. In this publication, power tools receive supply of power from commercially available AC power source. U.S. Pat. No. 7,281,886 discloses a dust collecting device having a motor driven by a commercial AC power source that is supplied to the dust collecting device via a power tool connected to the AC power source.

Japanese Laid-Open Patent Publication Nos. 2002-224631 and 2002-307332 and U.S. Pat. Nos. 6,615,930 and 6,951,439 disclose dust collecting devices having motors (DC motors) driven by rechargeable batteries. The motors are driven by the rechargeable batteries that are assembled with the dust collecting devices (in the case of Japanese Laid-Open Patent Publication Nos. 2002-224631 and 2002-307332) or by separate rechargeable batteries (U.S. Pat. Nos. 6,615,930 and 6,951,439). The rechargeable batteries also can supply electric power to power tools.

The dust collecting devices having motors driven by the rechargeable batteries can be used at places where no commercial AC power source outlet is available.

However, there still exists a need in the art for a dust collecting device having a battery-driven motor with improved functionality.

SUMMARY OF THE INVENTION

A fuel cell battery system can include a fuel cell battery assembly and a fuel gas tank. A suction device is driven by a motor and capable of producing flow of air for collecting dust. The motor can receive the supply of power from the fuel cell battery assembly. The fuel cell battery system, the motor and the suction device are assembled within a case.

BRIEF DESCRIPTION OF THE DRAWINGS

FIG. 15 is a view similar to FIG. 10 but showing a DC power tool mounted to the dust collecting device and receiving a supply of DC power from the fuel cell battery via an adaptor in place of a battery pack; and FIG. 16 is a side view of the adaptor.

DETAILED DESCRIPTION OF THE INVENTION

Each of the additional features and teachings disclosed above and below may be utilized separately or in conjunction with other features and teachings to provide improved dust collecting devices. Representative examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Several configurations will now be described with reference to FIGS. 1 to 16.

Figure 1:
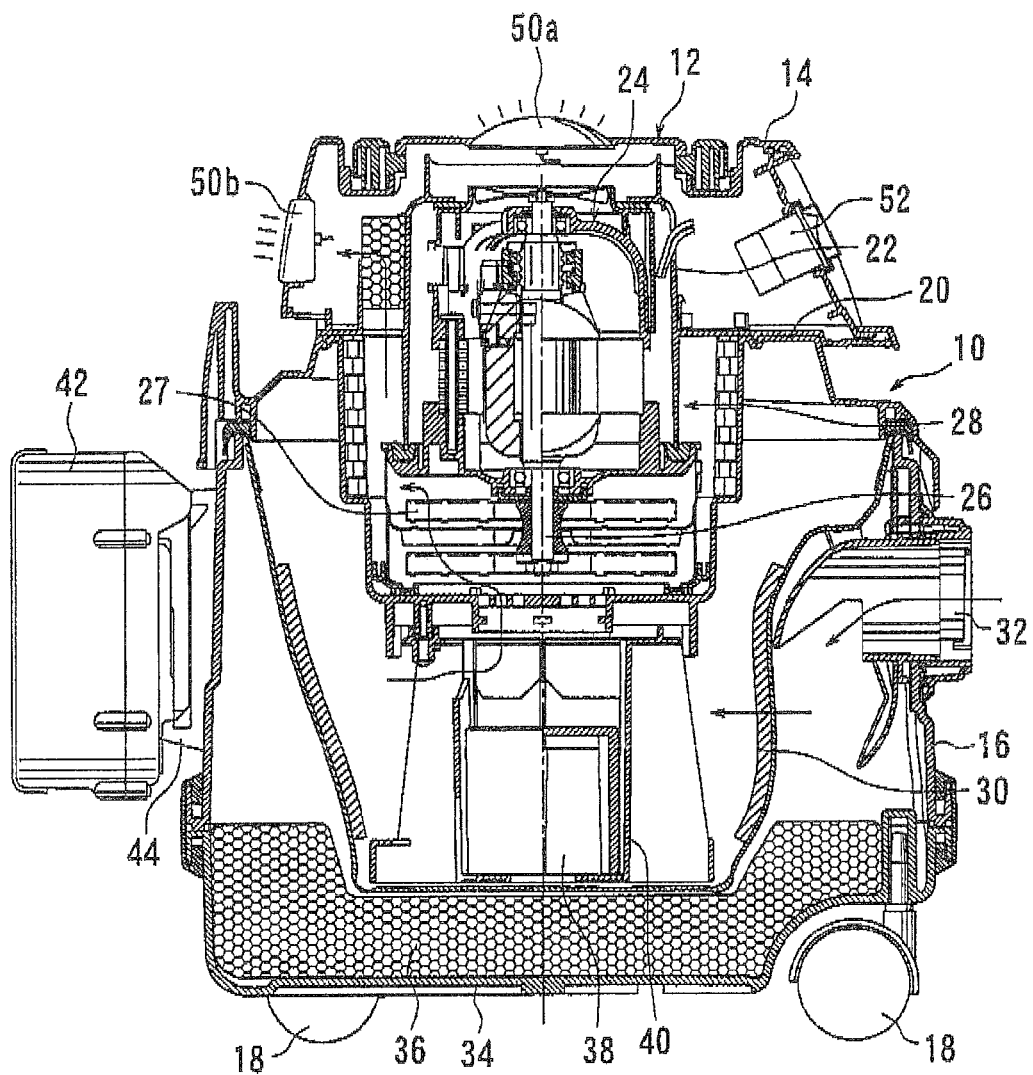
FIG. 1 is a vertical sectional view of a dust collecting device.
Figure 2:
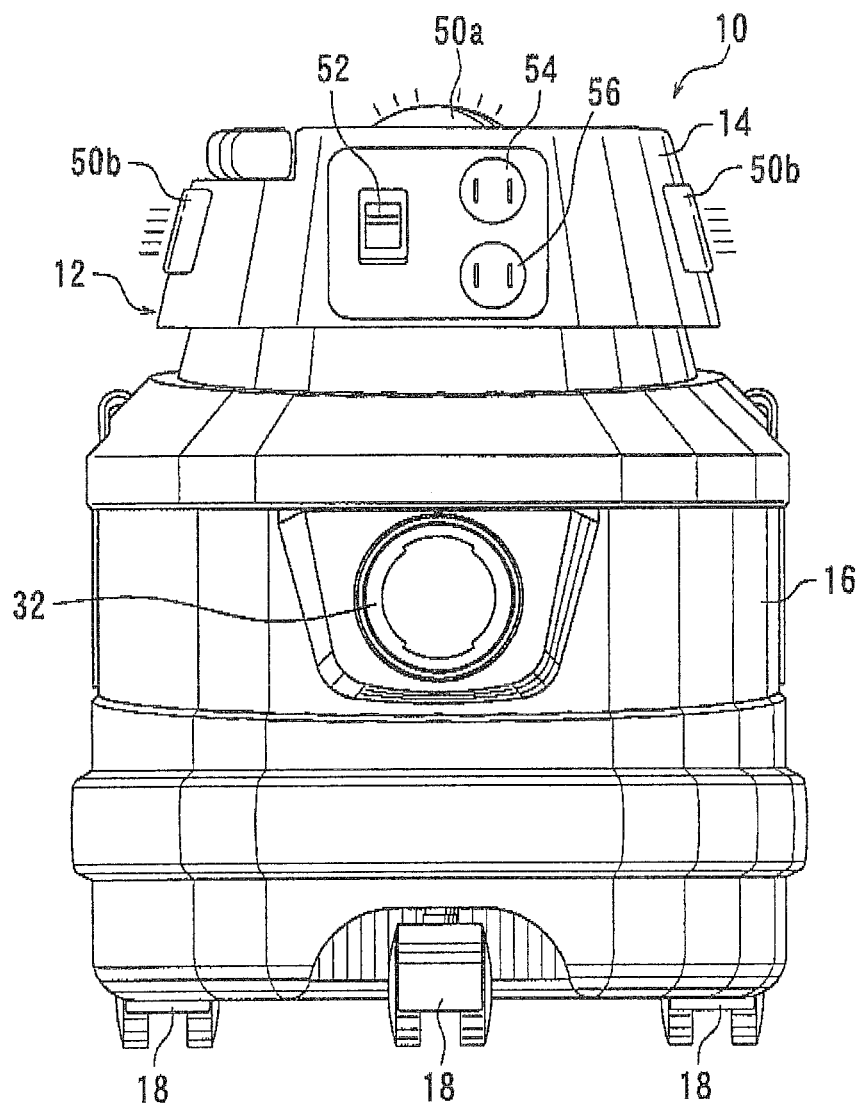
FIG. 2 is a front view of the dust collecting device.

Referring to FIGS. 1 and 2, a dust collecting device 10 has a casing 12 including an upper casing portion 14 and a lower casing portion 16. The upper casing portion 14 has a substantially conical configuration having a vertical central axis and having a diameter decreasing in an upward direction. The lower casing portion 16 has a substantially rectangular configuration in a horizontal sectional view and has a width gradually decreasing toward the front side (right side in FIG. 1). Three casters 18 including one disposed on the front side (right side as viewed in FIG. 1) and two disposed on the rear side (left side as viewed in FIG. 1) are mounted to the lower side of the bottom wall of the lower casing portion 16, so that the dust collecting device 10 can be easily moved to a desired workplace with the aid of the casters 18.

A support plate 20 extends along a boundary plane between the upper casing portion 14 and the lower casing portion 16 and joined to the lower end of the upper casing portion 14 and the upper end of the lower casing portion 16. A tubular motor support housing 22 is supported on a substantially central portion of the support plate 20 and extends substantially vertically therethrough, so that the motor support housing 22 has an upper portion extending into the upper casing portion 14 and a lower portion extending into the lower casing portion 16. A DC motor 24 is supported within the motor support housing 22 and has a rotational shalt 26. A fan 27 is mounted to the lower end of the rotational shaft 26 and positioned within the lower portion of the motor support housing 22.

A flow path 28 is defined within the motor support housing 22 for the flow of air from the side of the fan 27 to the upper opening of the motor support housing 22. The lower end of the motor support housing 22 is open into the lower casing portion 16. A filter 30 is disposed within the lower casing portion 16 and has an upper open end attached to the upper part of the lower casing portion 16, so that the filter 30 surrounds the lower portion including the lower opening of the motor support housing 22. A space within the lower casing portion 16 positioned on the outer circumferential side of the filter 30 serves as a dust collecting space. A hose joint 32 is provided on the lateral side of the lower casing portion 16 and communicates with a space defined on the outer side of the filter 30.

Therefore, when the DC motor 24 is driven to rotate the fan 27, air that may contain dust is drawn into the lower easing portion 16 from the hose joint 32 and then may be filtered by the filter 30. After having filtered, the air enters the motor support housing 22, flows upward within the motor support housing 22 along the flow path 28, and subsequently flows into the upper casing portion 14 as indicated by arrows in FIG. 1. Air exhaust openings (not shown) are formed in the upper casing portion 14, so that the air can be discharged to the outside via the air exhaust openings.

The lower part of the lower casing portion 16 having the casters 18 described above is configured as a removable bottom cover 34, so that the bottom of the lower casing portion 16 can be opened by removing the bottom cover 34. A fuel cell battery assembly 36 is mounted within the bottom cover 34. As described previously, the space on the outer circumferential side of the filter 30 serves as the dust collecting space. Therefore, the fuel cell battery assembly 36 is sealed from the dust collecting space. The fuel cell battery assembly 36 may generate an electric power through an electrochemical reaction between a fuel gas, such as hydrogen, and oxygen contained in the air. The fuel cell battery assembly 36 includes fuel cell batteries. As the fuel cell batteries, various types of well-known fuel cell batteries can be used. In one example, a fuel cell battery has an anode, a cathode and an electrolyte membrane disposed between the anode and the cathode. The anode receives a supply of hydrogen as the fuel gas and the cathode receives the supply of air, i.e., oxygen. The electrolyte membrane triggers the chemical reaction between the hydrogen and the oxygen, so that electricity is generated and water is produced. Although not shown in the drawings, a water discharge port is formed in the lower casing portion 16 for discharging water produced by the fuel cell batteries of the fuel cell battery assembly 36. Thus, in this configuration, the lower casing portion 16 serves to provide a space for collecting dust and to provide a space for receiving the fuel cell battery assembly 36. Because the fuel cell battery assembly 36 is positioned within the bottom space of the lower casing portion 16, water produced by the fuel cell battery assembly 36 can be easily discharged from the discharge port of the lower casing portion 16.

In this configuration, the fuel cell battery assembly 36 receives a supply of hydrogen from a hydrogen gas tank 38 via a supply pipe (not shown). The hydrogen gas tank 38 is supported within a support bracket 40 attached to the open lower end of the motor support housing 22 and extending vertically downward therefrom, so that the hydrogen gas tank 38 is positioned above the fuel cell battery assembly 36 and proximal to the upper surface thereof. The support bracket 40 is configured not to prevent flow of air into the motor support housing 22.

Figure 3:
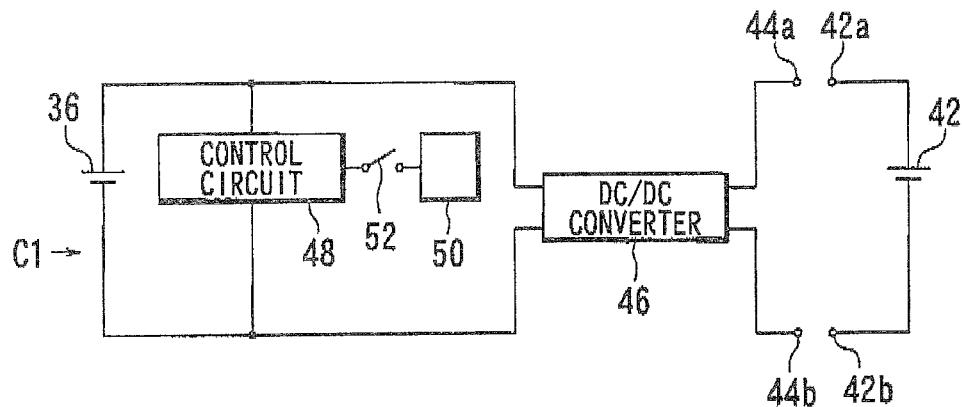
FIG. 3 is a circuit configuration of a power source circuit of the dust collecting device.
Figure 4:
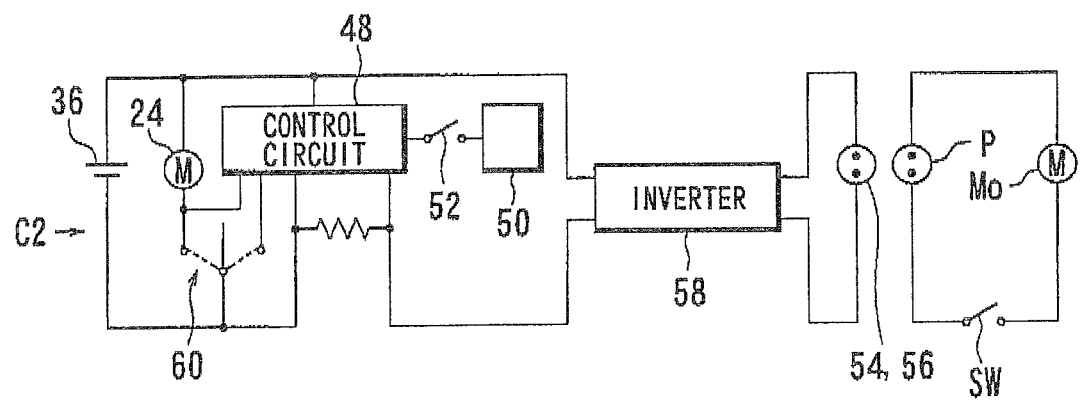
FIG. 4 is a circuit configuration of a charge control circuit of the dust collecting device.

The dust collecting device 10 has a charge control circuit C1 shown in FIG. 3 and a power supply circuit C2 shown in FIG. 4.

The charge control circuit C1 enables to recharge battery cells of a battery pack 42 shown in FIG. 1. The battery pack 42 can be detachably mounted to a power tool having a DC motor and can be used as a power source of the DC motor. For example, the power tool may be a screwdriver, a circular saw, and a hammer drill, etc. The fuel cell battery assembly 36 is electrically connected to positive and negative terminals 44a and 44b (see FIG. 3) of a charge terminal portion 44 provided on the lateral side of the lower casing portion 16 on the side opposite to the hose joint 32 (see FIG. 1). The battery pack 42 can be removably attached to the charge terminal portion 44 and has positive and negative terminals 42a and 42b (see FIG. 3) that can be connected to the corresponding terminals 44a and 44b of the charge terminal portion 44 when the battery pack 42 is mounted to the charge terminal portion 44. Therefore, the electric power produced by the fuel cell battery assembly 36 can be used for recharging the battery pack 42.

In the circuit configuration of the charge control circuit C1 shown FIG. 3, the fuel cell battery assembly 36 is connected to the terminals 44a and 44b via a DC/DC converter 46 that can convert an output voltage of the fuel cell battery assembly 36 into a voltage suitable to the battery 42. A control circuit (that may be a microcomputer) 48 can control the charging process during the charging operation. A lighting device 50 is connected to the control circuit 48 via a switch 52. As shown in FIG. 2, the switch 52 is mounted to a side wall of the upper casing portion 14. The lighting device 50 includes a top light 50a and a pair of side lights 50b. The top light 50a is mounted to a top wall of the upper casing portion 14. The side lights 42b are mounted to the side wall of the upper casing portion 14 at positions opposite to each other. When the operator turns on the switch 52, the control circuit 48 can receive the supply of power from the fuel cell battery assembly 36 to start the charge control operation, and at the same time, the lighting device 50 is lit, so that the user is known that it is possible to recharge the battery 42. Therefore, the switch 52 serves as a power source switch of the dust collecting device 10.

In the circuit configuration of the power supply circuit C2 shown in FIG. 4, the fuel cell battery assembly 36 is electrically connected to outlets 54 and 56 (see FIG. 2) via an inverter 58 that can convert a DC voltage supplied from the fuel cell battery assembly 36 into an AC voltage. The control circuit 48 and the lighting device 50 that are the same as those of the charge control circuit C1 are also included in the power supply circuit C2. However, for the power supply circuit C2, the control circuit 48 performs a control operation that is different from that performed in the charge control circuit C. Thus, when the switch 52 is turned on the control circuit 48 can perform a control operation according to a position of a manually operable selector switch 60 in addition to the charge control operation, and at the same the lighting device 50 is lit, so that it is known to the user that the outlets 54 and 56 are usable.

In the power supply circuit C2, the selector switch 60 can be switched to three different positions including a first ON position, a second ON position and an OFF position. In FIG. 4, the OFF position of the selector switch 60 is indicated by solid line. The first and second ON positions of the selector switch 60 are indicated by chain lines on the left side and the right side of the OFF position, respectively. When the selector switch 60 is in the OFF position, no power is supplied from the fuel cell battery system 36 to the DC motor 24 and to the inverter 58. When the selector switch 60 is switched to the first ON position, the power of the fuel cell battery assembly 36 is supplied directly to the DC motor 24 but no power is supplied to the inverter 58. Therefore, the DC motor 24 is driven but no AC power is supplied to the outlets 54 and 56. When the selector switch 60 is switched to the second ON position, the power of the fuel cell battery 36 is supplied to the DC motor 24 and also to the inverter 58 via the control circuit 48. Therefore, the DC motor 24 is driven, and at the same time, AC power is supplied to the outlets 54 and 56. Although not shown in the drawings, the selector switch 60 may be mounted to the side wall of the upper casing portion 14, for example, on the opposite side of the switch 52.

Figure 5:
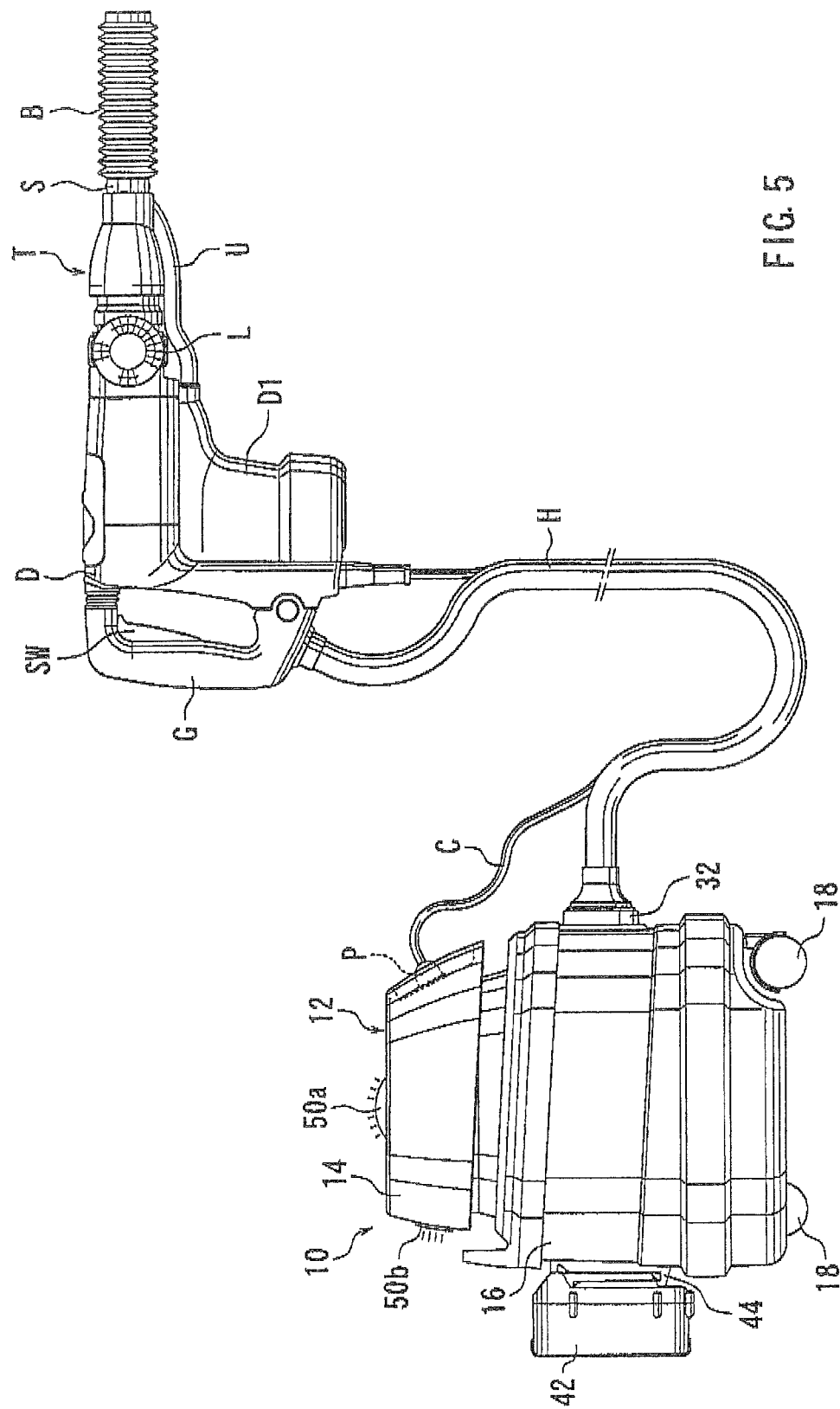
FIG. 5 is a view showing the dust collecting device and a power tool connected to the dust collecting device.

The dust collecting device 10 can be used for performing the following three different functions (1), (2) and (3):
(1) Dust Collecting Function
(2) AC Power Supplying Function
(3) Battery Charging Function The above functions (1) to (3) can be performed independently of each other or in combination of any of them and will be described with reference to FIG. 5. Referring to FIG. 5, in order to use the dust collecting device 10 for a power tool T and to perform the functions (1) and (2), a dust collecting hose H extending from the power tool T is connected to the hose joint 32 of the dust collecting device 10, and a plug P of an electric cord C, such as a cabtire cable, extending from the power tool T is connected to one of the outlets 54 and 56 of the dust collecting device 10. More specifically, the dust collecting hose H extends from a lower portion of a substantially inverted L-shaped tool body D, in which a dust collecting chamber is defined. A dust collecting tube U extends from a dust collecting case Dg (defining therein a dust collecting chamber) disposed at a lower portion of the tool body D to a position proximal to a tool bit B that will be explained later.

The tool bit B is mounted to a spindle S extending forwardly from the upper portion of the tool body D. An AC motor Mo (not shown in FIG. 5) is disposed within the tool body D and is coupled to the spindle S via a transmission mechanism (not shown).

In this example, the power tool T is a hammer drill and the tool bit B is configured to be suited to perform the hammering and drilling operation. The transmission mechanism converts the rotation of the motor Mo into a reciprocating movement of the spindle S and/or can reduce the rotation of the motor Mo for rotation of the spindle S. Therefore, the tool bit B can reciprocate and/or rotate. The AC motor Mo is electrically connected to the electric cord C and can receive the supply of AC power via the electric cord C. A trigger switch SW is mounted to a main handle G disposed on the rear side (left side in FIG. 5) of the tool body D and is operable by a user for starting and stopping the motor Mo. An auxiliary handle L is mounted to the tool body D, so that the user can hold the power tool T by rasping the main handle G and the auxiliary handle L with his or her both hands. This type of hammer drill is well known in the art and will not be described in detail.

In order to perform the functions (1) and (2), the user turns on the power source switch 52 of the dust collecting device 10 and operates the selector switch 60 to the second ON position, so that the DC motor 24 is driven and air is drawn into the lower casing portion 16 of the casing 12 from the hose joint 32. Then, the user turns the switch SW of the power tool T, so that the AC motor Mo is driven, with the supply of AC power from the outlet 54 or 56 of the dust collecting device 10 via the electric cord C, to rotate and/or reciprocate the spindle S and eventually the tool bit B. Therefore, the user can perform the hammering and drilling operation of a material, such as an interior material including a board and a wall. During the hammering and drilling operation of the material, dust may be produced. Such dust can be drawn into the dust collecting case Dg from the dust collecting tube U and further into the dust collecting device 10 via the dust collecting hose H.

If it is not necessary to perform the function (2) (AC power supply function), the user operates the selector switch 60 to the first ON position, so that no AC power is supplied to the outlets 54 and 56 although the power may be supplied to the DC motor 24. In this case, the dust collecting device 10 can still perform the function (1) (dust collecting function). Therefore, for example, the dust collecting device 10 can be used for collecting dust that may be produced during the operation of a power tool (not shown) that has no dust collecting hose H. Such a power tool may be a battery-driven power tool or a power tool driven by an AC motor and connected to a commercial AC outlet. In this case, a dust collecting hose (not shown) may be connected to the hose joint 32 and may be extended to a position where dust is produced by the operation of the power tool.

The function (3) (battery charging operation) can be performed as long as the power source switch 52 is turned on. Therefore, this function (3) is also available when the function (1) and/or function (2) are performed. If the user wishes to use only the function (3), the user operates the selector switch 60 to the OFF position, so that the functions (1) and (2) are not available. Then, the user mounts the battery pack 42 to the charge terminal portion 44, so that the battery pack 42 is recharged. As described previously, the battery pack 42 can be detachably mounted to a power tool having a DC motor and can be used as a power source of the DC motor. Therefore, after completion of the charging process, the battery pack 42 is removed from the charge terminal portion 44 and is mounted to a power tool having a DC motor, so that the DC motor can be driven by the DC power supplied from the rechargeable battery 42.

As described above, the dust collecting device 10 of this example has the fuel cell battery assembly 36 as a power source, and therefore, it is possible to use the dust collecting device 10 in a place where no AC outlet is available. In addition, because the fuel cell battery assembly 36 can have a large capacity than known rechargeable batteries. Therefore, the DC motor 24 can have a large output to produce a large suction force.

Because the fuel cell battery assembly 36 is disposed within the bottom space of the removable lower casing portion 16 of the casing 12 of the dust collecting device 10, it is possible to easily discharge water that may be produced by the fuel cell battery assembly 36.

Because the lighting device 50 including the top light 50a and a pair of side lights 50b are mounted to the upper casing portion 14 and are lit when the operator turns on the power source switch 52, the operator can easily recognize that the dust collecting device 10 can be used for any of the functions (1) to (3) described above. In particular, in the case that the dust collecting device 10 and/or the power tool connected thereto are used in a dark place, where no power source is available, the lighting device 50 can illuminate the surrounding of the dust collecting device 10 to enable the user to easily perform any of the above functions (1) to (3). It is also possible to use the lighting device 50 for illuminating the surrounding during transportation of the dust collecting device 10 in a dark place.

Further, because the dust collecting device 10 can be used for three different functions (1) to (3), it can provide improved versatility. In particular, the dust collecting device 10 can provide an AC power for the power tool T having the AC motor Mo shown in FIG. 5, and therefore, it is possible to use the dust collecting device 10 for both of a power tool that requires an AC power source and a battery-driven power tool. Thus, if the dust collecting device 10 is used for collecting dust produced by the power tool receiving the supply of power from the battery pack 42, it is only necessary to connect a dust collecting hose to the hose joint 32 for performing the function (1). If the battery pack 42 is necessary to be recharged, the battery pack 42 can be recharged by mounting it to the charge terminal portion 44.

Figure 6:
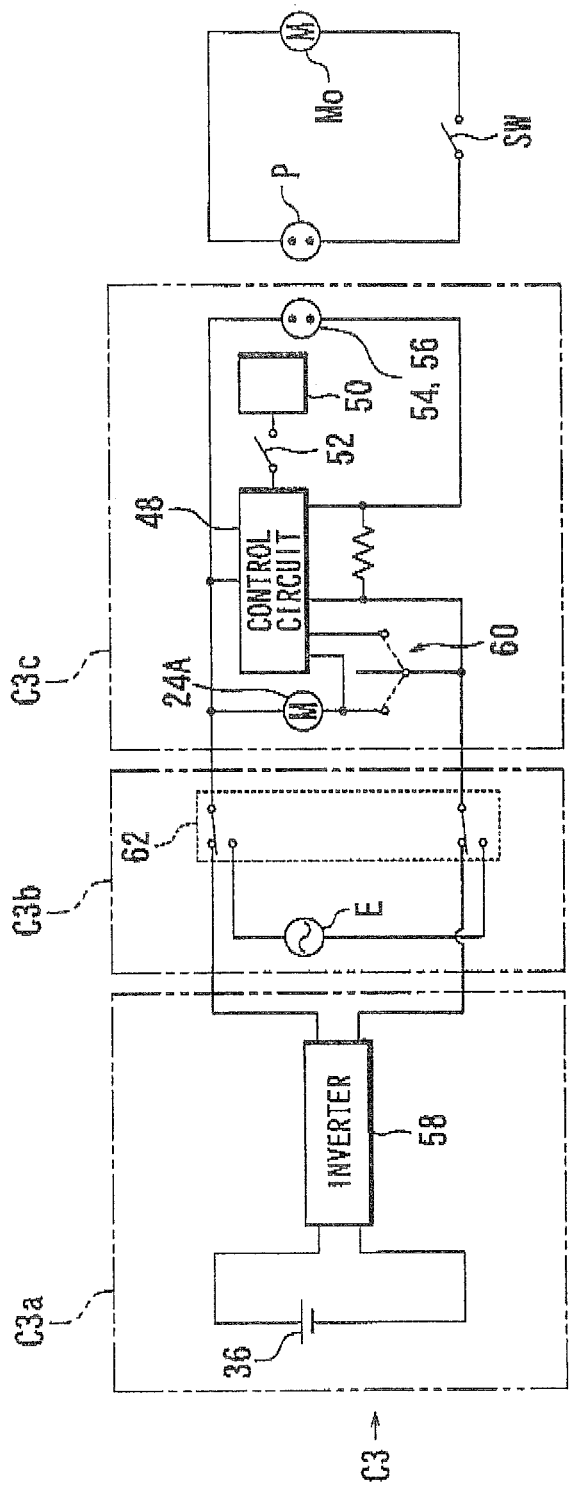
FIG. 6 is a circuit configuration similar to FIG. 4 but showing an alternative configuration.

This configuration can be modified in various ways. For example, although the power source circuit C2 described previously is configured such that the DC motor 24 and the AC outlets 54 and 56 of the dust collecting device 10 receive the supply of power from only the fuel cell battery assembly 36, it is possible to also use a commercially available power source for supplying the power to the DC motor 24 and the AC outlets 54 and 56. FIG. 6 shows an alternative power supply circuit C3 enabling this function. In FIG. 6, elements that are similar to those of the power supply circuit C2 shown in FIG. 4 are labeled with the same reference numerals and the description of these elements will not be repeated.

The power supply circuit C3 shown in FIG. 6 has a first circuit portion C3a, a second circuit portion C3b and a third circuit portion C3c. The first circuit portion C3a includes the fuel cell battery assembly 36 and the inverter 58 that can convert a DC voltage supplied from the fuel cell battery 36 into an AC voltage, so that the first circuit portion C3a can output an AC voltage. The second circuit portion C3b includes an AC power source E, so that the second circuit portion C3b can directly output an AC voltage. The second circuit portion C3b farther includes a switch 62 operable to connect the first circuit portion C3a to the third circuit portion C3c or connect the third circuit portion C3c to the AC power source E. Therefore, the third circuit portion C3c can selectively receive the supply of the AC voltage from the first circuit portion C3a or from the AC power source E of the second circuit portion C3b according to the operation of the switch 62. The third circuit portion C3c includes an AC motor 24A, the control circuit 48, the selector switch 60 and the lighting device 50 that are connected to each other in the same relationship with the DC motor 24, the control circuit 44, the selector switch 60 and the lighting device 50 of the power supply circuit C2 of the above example.

Therefore, when the switch 62 is operated to connect the first circuit portion C3a to the third circuit portion C3c, the AC motor 24A and the outlets 54 and 56 can receive the supply of AC power from the fuel cell battery assembly 36 via the inverter 24. On the other hand, when the switch 62 is operated to connect the AC power source E to the third circuit portion C3c, the AC motor 24A and the outlets 54 and 56 can receive the supply of AC power from the AC power source E. The selector switch 60 can be operated to achieve three different functions similar to those explained in the above example.

Although not shown in the drawings, the switch 62 may be mounted, for example, to the upper casing portion 14 of the casing 12. In addition, the power source circuit C3 may include an electric cord having a plug connectable to an outlet of the AC power source E. Otherwise, the power source circuit C3 may include a socket and an electric cord having plugs connectable to the socket and an outlet of the AC power source E.

In this way, according to this alternative arrangement, it is possible to selectively use the fuel cell battery 36 or the commercially available AC power source E as a power source for achieving the function (1) (dust collecting function), while it is possible to also achieve the functions (2) and (3) (AC power supply function and battery charging function).

Figure 7:
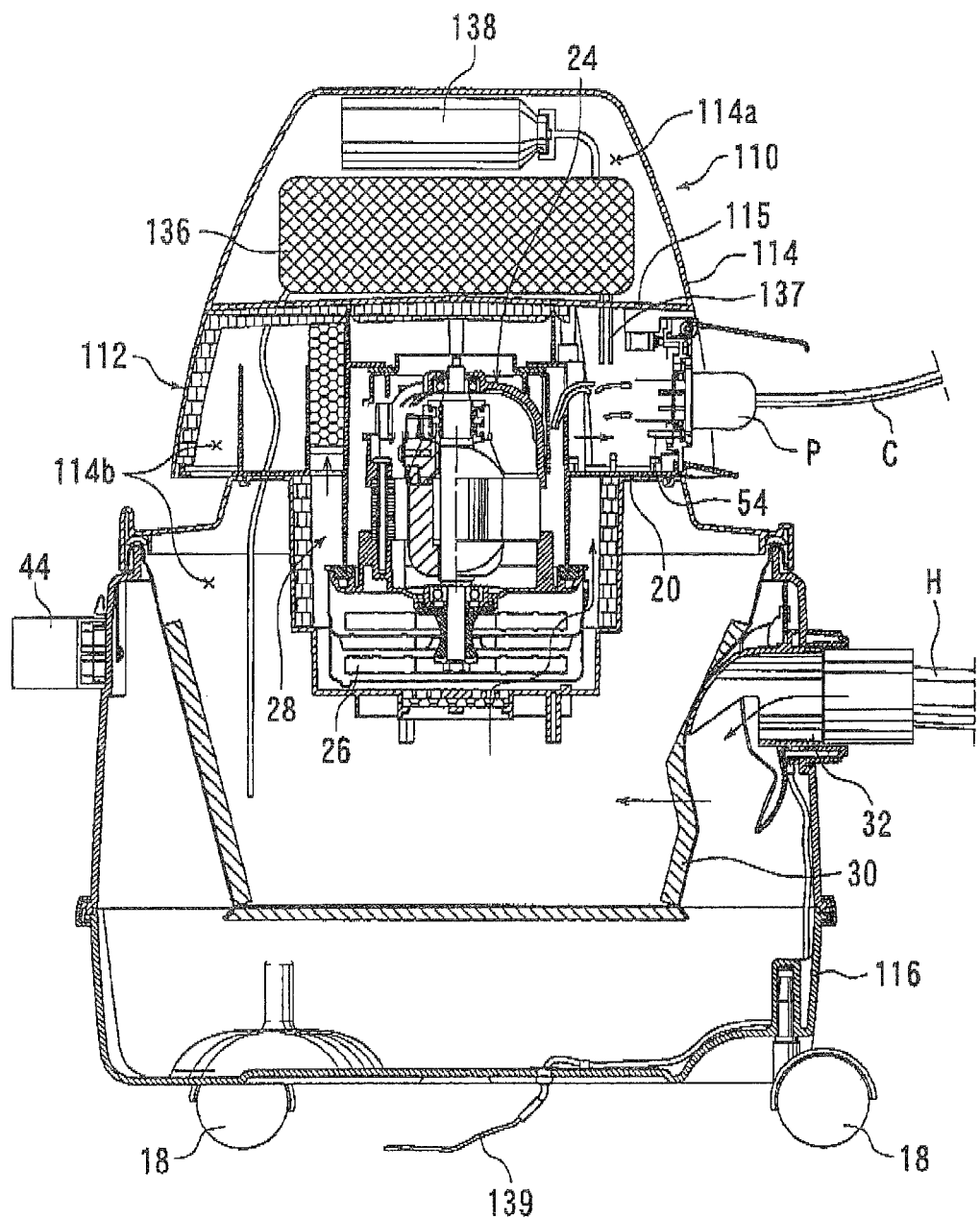
FIG. 7 is a vertical sectional view of a dust collecting device having another configuration.

Another configuration will now be described with reference to FIG. 7. This configuration is similar to the previous configuration, therefore like members are given the same reference numerals and a description of these members will not be repeated.

A dust collecting device 110 can include a casing 112 having an upper casing portion 114 and a lower casing portion 116. However, this casing 112 is different in that the space within the upper casing portion 114 is separated into an upper space 114a and a lower space 114b by a horizontal partition plate 115. Within the upper space 114a, a fuel cell battery assembly 136 is supported on the partition plate 115, and a hydrogen gas tank 138 is supported on the upper side of the fuel cell battery 136. The DC motor 24 and other components relating to the dust collecting function are disposed within the lower space 114b.

Although not shown in the drawings, a door may be provided on a side wall of the upper casing portion 114 at a position opposed to the upper space 114a in order to allow access to the fuel cell battery 136 and the hydrogen gas tank 138. Alternatively, a part of the upper casing portion 114 defining the upper space 114a may be formed separately from the remaining part of the upper casing portion 114 and may be removably mounted to the remaining part. In this connection, air discharge openings (not shown) may be formed in a side wall of a part of the upper casing portion 114 defining the lower space 114b on the upper side of the support plate 20

The space within the lower casing portion 116 serves as a dust collecting space and also as a water storing space for storing water that may be produced by the fuel cell battery 136. In this connection, a water guide pipe 137 is connected to the fuel cell battery 136 and extends into the lower space 114b of the upper casing portion 114 through the partition plate 115. Although not shown in the drawings, the water guide pipe 137 extends downward through the support plate 20 and the filter 30, so that the lower end of the water guide pipe 137 opens at a position proximal to the upper opening of the lower casing portion 116. The water stored within the lower casing portion 116 can be discharged to the outside via a water discharge pipe 139 that extends between inside and outside of the lower casing portion 116 through its bottom wall.

With the arrangement of the above configuration, it is possible to ensure a large space for storing the dust and the water by the space within the lower casing portion 116. In addition, because the space within the lower casing portion 116 serves to store the dust and the water together, it is possible to effectively use the space.

Figure 8:
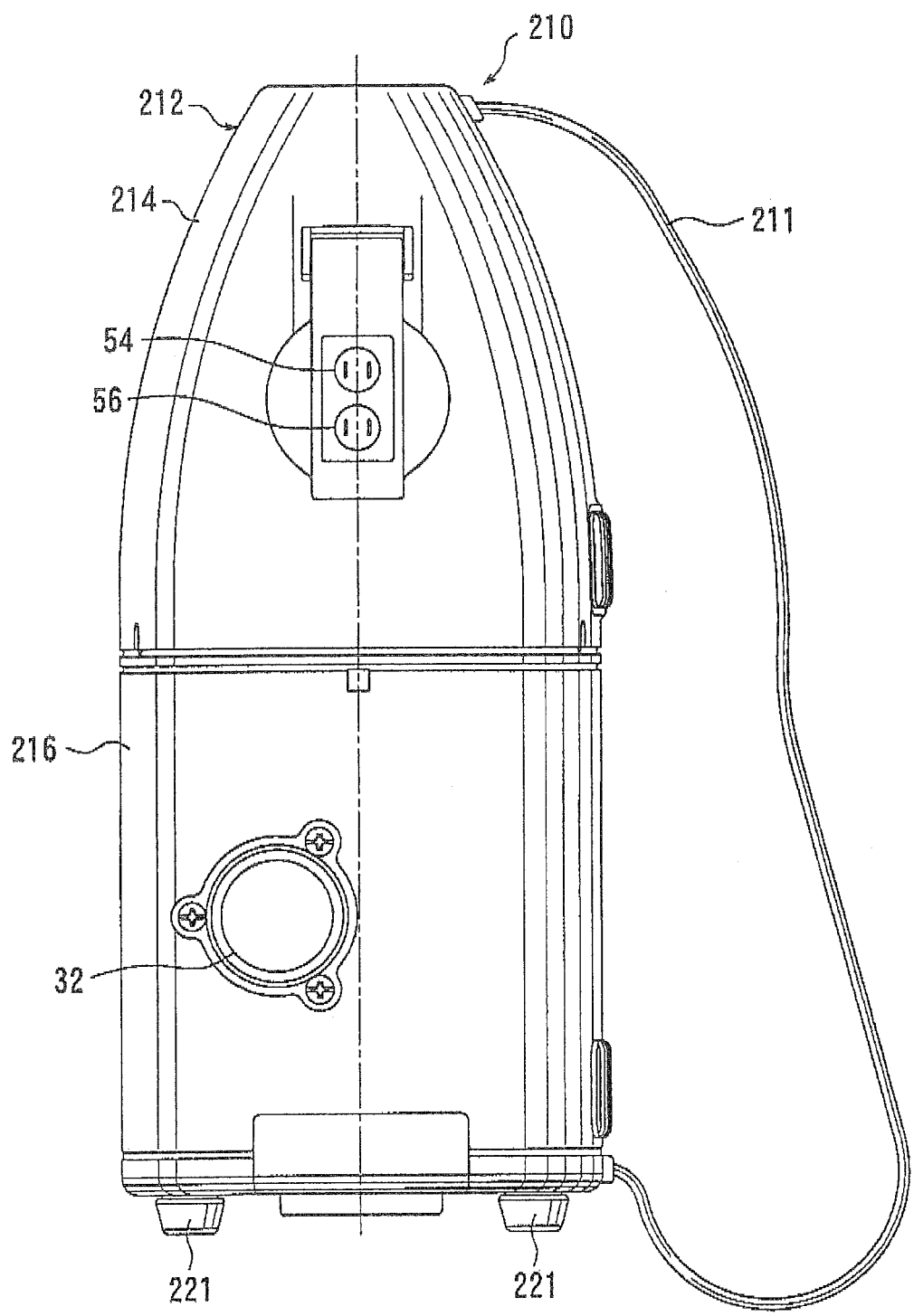
FIGS. 8 and 9 are side view and a front view with a part shown in cross section of a dust collecting device according to another configuration.

Another configuration will now be described with reference to FIGS. 8 and 9. This configuration has similarities to previous configurations, therefore, like members are given the same reference numerals and a description of these members will not be repeated.

A dust collecting device 210 can include a casing 212 having an upper casing portion 214 and a lower casing portion 216. However, this casing 212 is different in that the easing 212 is flattened in the widthwise direction (right and left directions in FIG. 8). More specifically, each of the upper casing portion 214 and the lower casing portion 216 has a substantially rectangular horizontal cross section and has a width that is smaller than the length in the forward and rearward directions (right and left directions in FIG. 9). In addition, the width of the upper casing portion 216 becomes smaller in the upper direction.

A shoulder strap 211 has an upper end and a lower end. The upper end of the shoulder strap 211 is attached to the upper end of the outer surface of the right side wall of the upper casing portion 214. The lower end of the shoulder strap 211 has a lower end attached to the lower end of the outer surface of the right side wall of the lower casing portion 216. Therefore, the user can carry the dust collecting device 210 on his or her back by using the shoulder strap 211. Because the casing 212 is flattened in the widthwise direction, the user can stably carry the dust collecting device 210. In addition, the width of the upper casing portion 116 becomes smaller in the upper direction, it is not necessary for the user to incline his head forwardly when carrying the dust collecting device 210.

Figure 9:
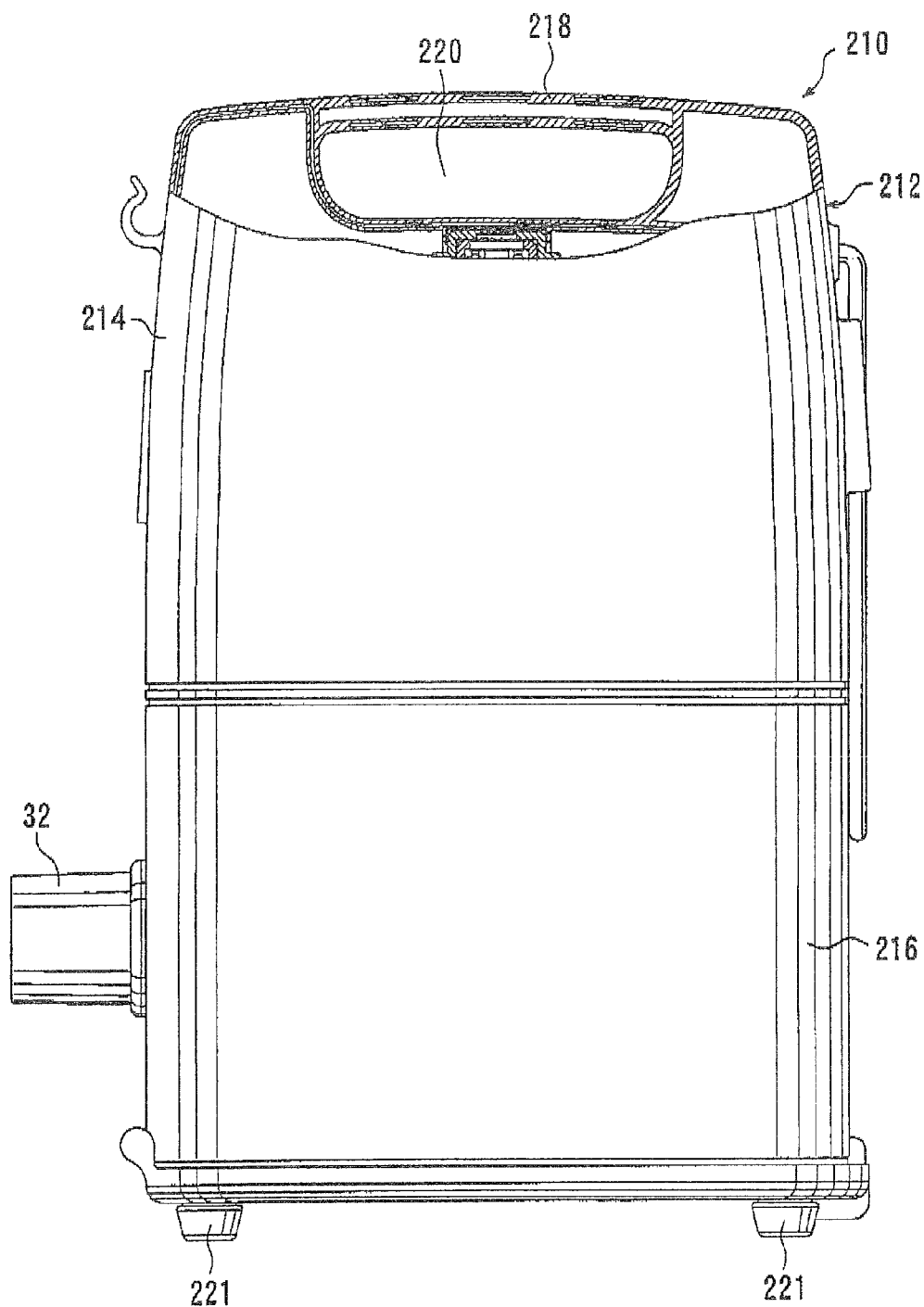

Further, as shown in FIG. 9, the upper casing portion 214 is formed with a handle 218 configured to be grasped with a hand of the user. A space 220 is formed on the lower side of the handle 218 for enabling insertion of fingers of the user when he or she, grasps the handle 218. Therefore, the user can carry the dust collecting device 210 by using the handle 218 for moving it by a short distance.

In this connection, four support legs 221 are provided on the lower side of the bottom wall of the lower casing portion 216, so that the dust collecting device 210 can be placed in stable on a floor or the like before and after transportation.

In addition, the hose joint 32 mounted to the front wall of the lower casing portion 216 is offset on the left side from the vertical central line of the front wall. In other words, the hose joint 32 is positioned away from the user who carries the dust collecting device 210. Therefore, it is possible to minimize the potential hindrance of a hose that may be connected to the hose joint 32 during the dust collecting operation.

In this configuration, the power source switch 52 is not positioned proximal to the outlets 54 and 56 but is mounted to the left side wall of the upper casing portion 214 although not shown in the drawings.

Another configuration will now be described with reference to FIGS. 10 to 14. A dust collecting device 310 can be assembled with a power tool T1 that has a construction basically similar to the power tool T shown in FIG. 5.

Figure 10:
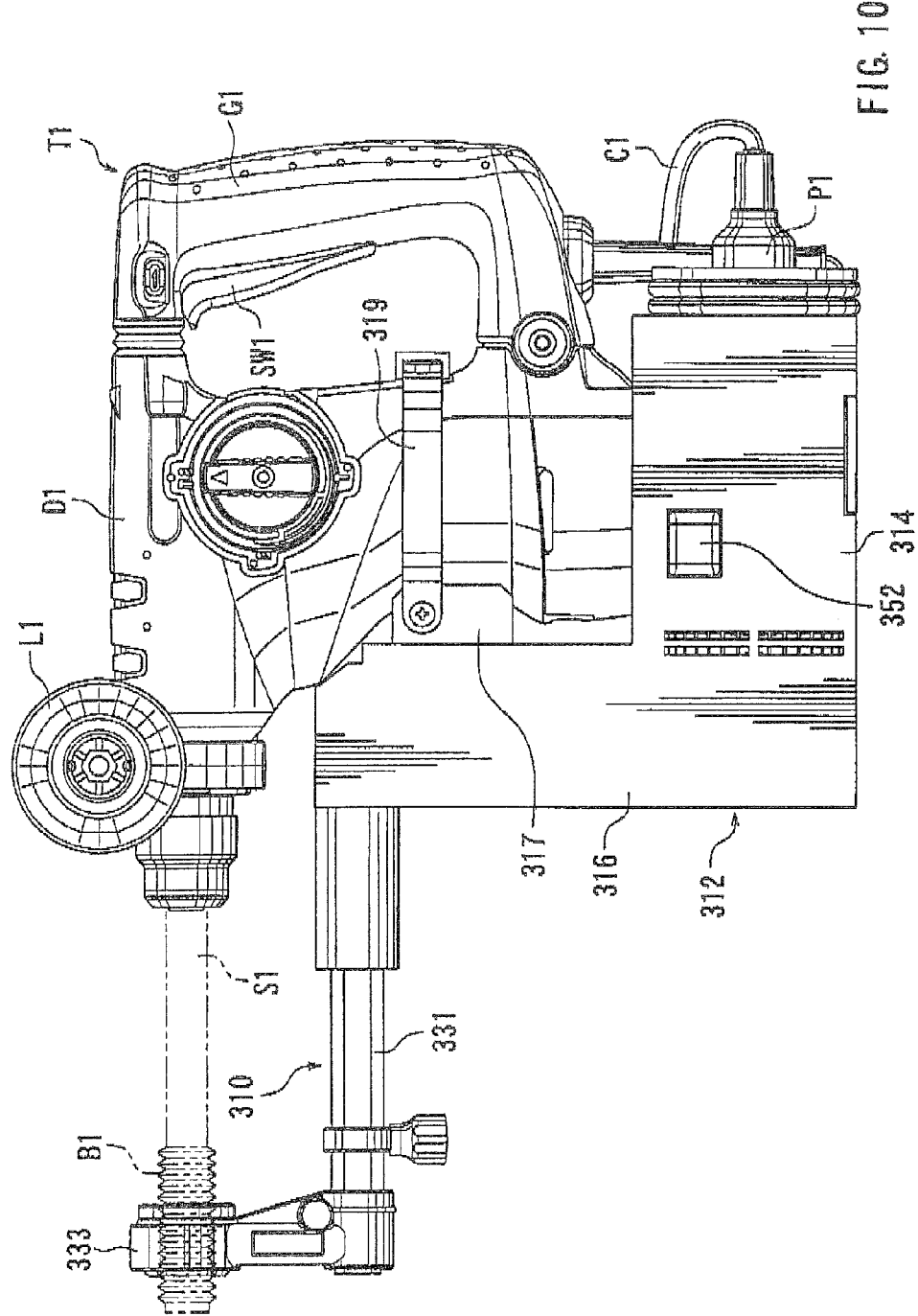
FIGS. 10, 11, 12 and 13 are side view, a vertical sectional view, a rear view and a rear view with a part shown in cross sections respectively, of a dust collecting device according to another configuration and showing an AC power tool mounted to the dust collecting device.
Figure 12:
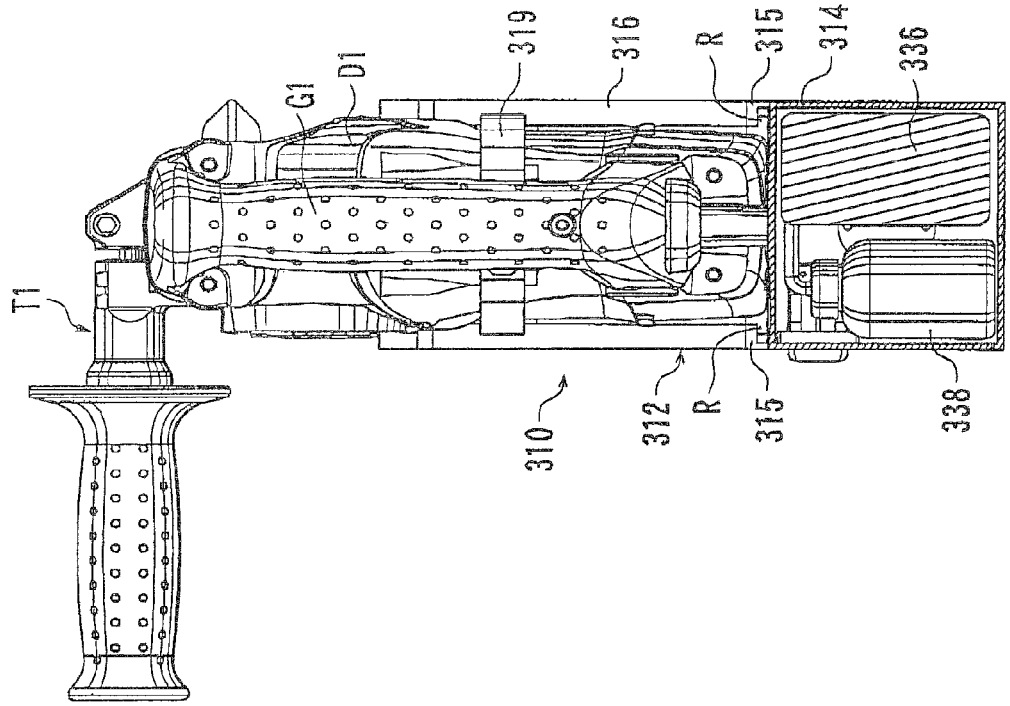
Figure 13:
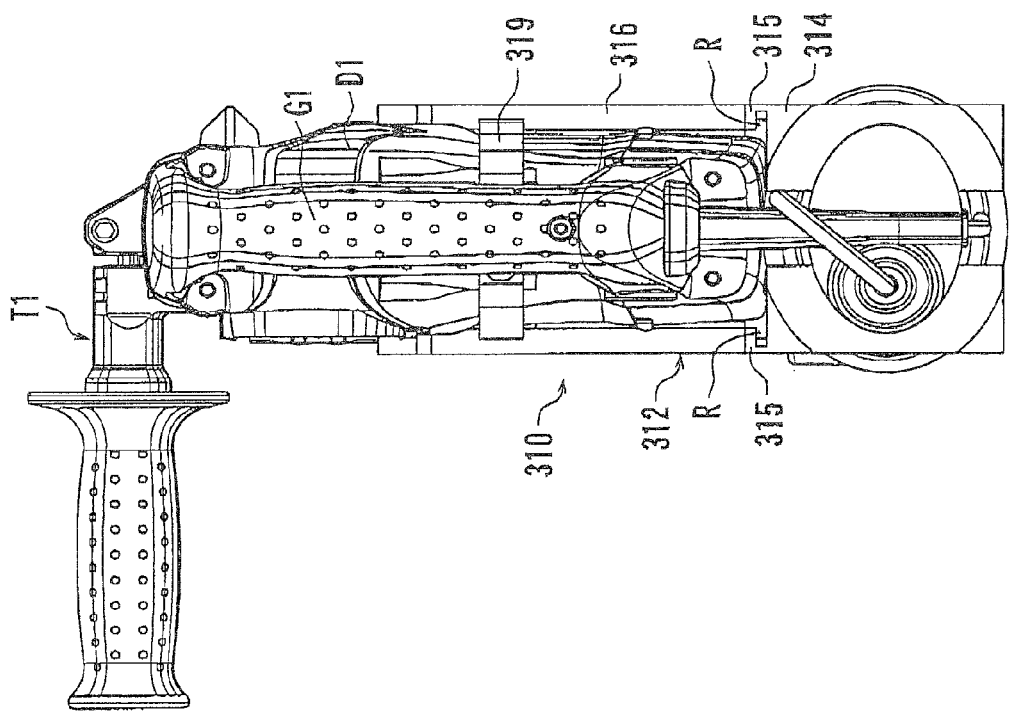

The dust collecting device 310 includes a casing 312 having a substantially L-shape as viewed from a left side (see FIG. 10). More specifically the casing 312 includes a base portion 314 extending substantially in a horizontal direction and a dust collecting portion 316 extending vertically upward from the rear end (left end in FIG. 10) of the base portion 314. As shown in FIGS. 12 and 13, the base portion 314 has a rectangular sectional configuration as viewed from a front side, while the dust collecting portion 316 has a rectangular sectional configuration as viewed from a plan view.

A fuel cell battery assembly 336, a hydrogen gas tank 338, a DC motor 324 corresponding to the fuel cell battery 36, the hydrogen gas tank 38 and the DC motor 24 of the first configuration are disposed within the base portion 314. A control circuit 334 corresponding to the control circuit 44 shown in FIGS. 3 and 4 is also disposed within the base portion 314. The control circuit 334 may have a circuit configuration similar to the power source circuit C2 of the first configuration, with a modification that the selector switch 60 is omitted to always enable the function (1) (Dust Collecting Function) and the function (2) (AC Power Supplying Function). In the case of the control circuit 334, the battery charging function (3) may be omitted and the battery charging circuit C1 is not necessary provided as explained later. An AC outlet 354 corresponding to the outlet 54 or 56 of the first configuration is mounted to the rear wall (right side wall as viewed in FIG. 11) of the rear portion 314 and always receives the supply of AC power when a switch 352 corresponding to the switch 52 is turned on.

A fan 327 is mounted to an output shaft 326 of the motor 324 and is positioned opposed to a communication opening 329 communicating between the space within the base portion 314 and the space within the dust collecting portion 316, so that a flow of air from within the dust collecting portion 316 into the base portion 314 can be produced as the motor 324 is driven.

A filter 330 is disposed within the dust collecting portion 316 for collecting dust contained within air drawn into the base portion 314. An L-shaped nozzle 331 defining therein a flow path of air is mounted to the upper end of the dust collecting portion 316 and extends forwardly from the dust collecting portion 316. An upper end of the nozzle 331 is formed with an annular tube 333 having an inner wall, where the flow path of the nozzle 331 is opened. Therefore, the dust containing air may be drawn from inside of the annular tube 333 to flow within the dust collecting portion 316.

Figure 11:
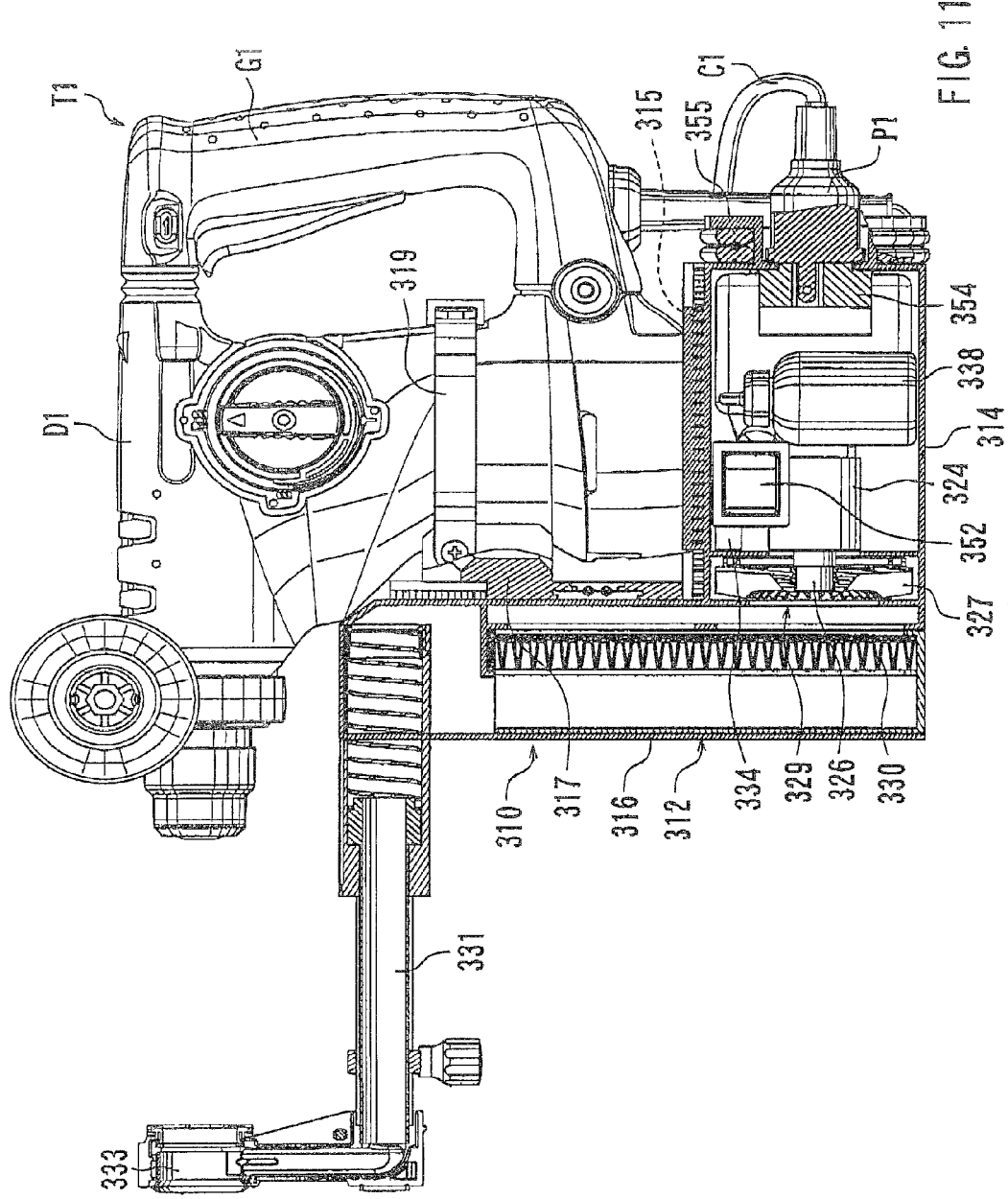

Referring to FIGS. 12 and 13, the upper surface of the base portion 314 is formed as a flat surface and has a pair of rails 315 that can engage corresponding projections R formed on a bottom portion of a tool body D1 of the power tool T1 when the tool body D1 is moved along the upper surface of the base portion 314 in the left direction as viewed in FIGS. 10 and 11. The tool body D1 has a substantially inverted L-shape and has a lower portion and an upper portion. The lower portion of the tool body D1 extends substantially in a vertical direction. The upper portion of the tool body D1 extends forwardly (leftward as viewed in FIGS. 10 and 11) from the upper end of the lower portion. A main handle G1 having a trigger switch SW1 similar to the switch SW has an upper end connected to the upper portion of the tool body D1 and a lower end connected to the lower portion of the tool body D1.

In the mounted state shown in FIGS. 10 and 11, the lower portion of the tool body D1 is supported by a support member 317 mounted to the rear side (right side in FIGS. 10 and 11) of the dust collecting portion 316 of the case 312 of the dust collecting device 310. A fastening belt 319 is attached to the support member 317 and can be fastened around the lower portion of the tool body D1. Therefore, in the mounted state, the tool body D1 is prevented from moving relative to the dust collecting device 310 in a vertical direction by the engagement of the projections R with the guide rails 315 and also in a horizontal direction by the support member 317 and the fastening belt 319.

Similar to the power tool T, a tool bit B1 is mounted to a spindle S1 extending forwardly from the upper portion of the tool body D1. An AC motor (not shown) similar to the AC motor Mo is disposed within the tool body D1 and is coupled to the spindle S1 via a transmission mechanism (not shown).

Also, the power tool T1 is a hammer drill and the tool bit B1 is configured to be suited to perform the hammering and drilling operation. However, the power tool T1 of this example is different from in that an auxiliary handle L1 similar to the auxiliary handle L is mounted to be positioned at the upper end of the upper portion of the tool body D1. In addition, the lower portion of the tool body D1 is not configured to define a dust collecting chamber.

In the mounted state, the tool bit B1 extends forwardly through the annular tube 333 of the nozzle 331 of the dust collecting device 310, so that cutting chips of a workpiece produced during the drilling operation of the tool bit B1 can be effectively drawn into the nozzle 331.

The AC motor disposed within the tool body D1 is electrically connected to an electric cord C1 (e.g., a cabtire cable) that extends downward from the rear end of the lower portion of the tool body D1. The electric cord C1 has a plug P1 that can be connected to the outlet 354.

In order to use the dust collecting device 310, the user mounts the power tool T1 on the dust collecting device 310. To this end, the user slidably moves the tool body D1 along the upper surface of the base portion 314, so that the protrusions R at the bottom of the tool body D1 engage with the rails 315. The user continues the sliding movement until the lower portion of the tool body D1 contacts the support member 317.

After that, the user fastens the lower portion of the tool body D1 by the fastening belt 317, so that the power tool T1 is fixed in position relative to the dust collecting device 310 in a state of being supported on the base portion 314 of the dust collecting device 310. In this state, the electric cord C1 extending downward from the lower portion of the tool body D1 is positioned on the rear side of the base portion 314. Therefore, the electric cord C1 does not interfere with the mounting operation of the power tool T1.

Thereafter, the operator connects the plug P1 of the cord C1 to the outlet 354. However, because the distance between the power tool T1 and the outlet 354 is relatively short, a substantial length of the cord C1 may be left to be slacked. To this end, a cord reel 355 is formed integrally with the rear wall of the base portion 314 of the case 312 and positioned to surround the outlet 354. Therefore, the slacked length of the cord C1 can be wound around the cord reel 355, so that cord C1 may not be slacked to interfere the handling of the power tool T1.

After the power tool T1 has been mounted to the dust collecting device 310, the user turns on the switch 352, so that the motor 324 starts to produce a flow of air from the annular tube 333 of the nozzle 331 into the dust collecting portion 316. At the same time, AC power is supplied to the power tool T1 via the outlet 354 and the cord C1. Then, the user holds an assembly of the power tool T1 and the dust collecting device 310 by grasping the main handle G1 and the auxiliary handle L1 with his or her both hands and operates the trigger switch SW1 so that the AC motor stars to drive the tool bit B1. As described previously, the cutting chips or dust produced during the drilling operation can be drawn from the nozzle 331 and collected within the dust collecting portion 316 of the dust collecting device 310.

With this configuration, the dust collecting device 310 having the fuel cell battery 336 assembly as the power source can be used for driving the power tool T1 having the AC motor as a drive source. In addition, the power tool T1 can be used as an assembly with the dust collecting device 310. Therefore, it is possible to use the power tool T1 together with the dust collecting device 310 in a place where no AC power source is available.

The dust collecting device 310 can be used in combination with the power tool T1 having the AC motor as a power source. However, the dust collecting device 310 can be also used in combination with a battery-driven power tool T2 shown in FIG. 14. The power tool T2 has a DC motor (not shown) as a power source. In this connection, the power tool T2 has no cord for connection with the outlet 354 (not shown in FIG. 14) but has a battery pack Y detachably mounted to the rear part of lower portion of the power tool T2. Other than these constructions, the power tool T2 is the same as the power tool T1. Therefore, in FIG. 14, like members are give the same reference numerals as the configuration shown in FIGS. 10 to 13.

For example, the battery pack Y may be similar to the battery pack 42 shown in FIG. 1 and described in connection with the first example.

Figure 14:
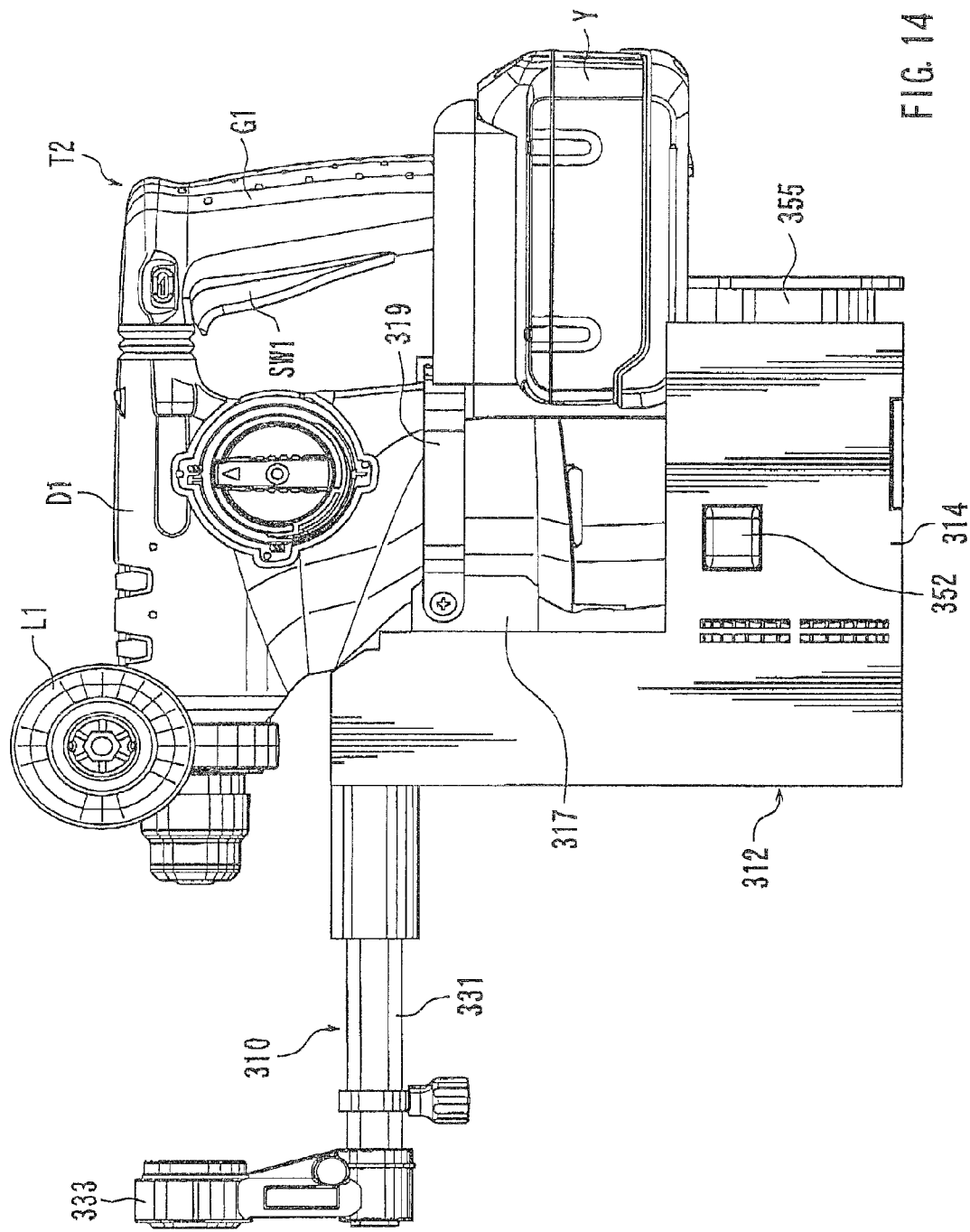
FIG. 14 is a view similar to FIG. 10 but showing a DC power tool mounted to the dust collecting device.

FIG. 15 shows an alternative arrangement, in which the battery pack Y shown in FIG. 14 is replaced with an adaptor 400 shown in FIG. 16. The adaptor 400 has a casing 420 and an AC/DC converter (not shown) disposed therein the casing 420. In addition, the adaptor 400 has a cord 401 having a plug 403 connectable to the outlet 354 (not shown in FIG. 15) of the dust collecting device 310, so that AC power can be supplied to the AC/DC converter that converts AC power into DC power. The external configuration of the casing 420 is similar to the casing of the battery pack Y or the battery pack 42 and can be detachably mounted to the power tool T2. In addition, the adaptor 400 may have positive and negative terminals (not shown) that are similar to the positive and negative terminals 44a and 44b of the battery pack 42 (see FIG. 1) and are electrically connected to the AC/DC converter. Therefore, DC power is supplied to the positive and negative terminals from the AC/DC converter.

In this way, the adaptor 400 can be used for supplying DC power to the DC motor of the power tool T2 in the same manner as the battery Y.

The invention claimed is:

1. A dust collecting device for a power tool, comprising:
   a case;
   a fuel cell battery system including a fuel cell battery assembly and a fuel gas tank;
   a DC motor capable of being electrically connected to the fuel cell battery assembly;
   a suction device driven by the motor and capable of producing flow of air for collecting dust; and
   a power source circuit electrically connected between the fuel cell battery assembly and the motor, so that the motor is driven with supply of an electric power from the fuel cell battery assembly; wherein
   the fuel cell battery system, the motor and the suction device are assembled within the case; and
   the power source circuit includes an electric outlet mounted to the case and electrically connected to the fuel cell battery assembly via a DC/AC inverter, so that an AC power is available from the electric outlet.

2. The dust collecting device as in claim 1, wherein the power source circuit further includes a switch operable between a first position and a second position,
   when the switch is in the first position, the DC power is supplied from the fuel cell battery assembly to the motor but is not supplied to the DC/AC inverter; and
   when the switch is in the second position, the DC power is supplied from the fuel cell battery assembly to both of the motor and the DC/AC inverter.

3. The dust collecting device as in claim 1, further comprising:
   a charge terminal portion provided on the case and having charge terminals, the charge terminals being electrically connectible to a rechargeable battery of a power tool for recharging the rechargeable battery; and
   a battery charging circuit electrically connected between the fuel cell battery assembly and the charge terminals.

4. The dust collecting device as in claim 3, further comprising a control circuit electrically connected to the power source circuit and the battery charging circuit for controlling the supply of power from the fuel cell battery assembly to the motor and the outlet of the power source circuit and for controlling the supply of power from the fuel cell battery assembly to the charge terminals.

5. The dust collecting device as in claim 1, further comprising a light device mounted to the case and capable of receiving the supply of power from the fuel cell battery assembly, so that the light device can illuminate the surrounding of the dust collecting device.

6. The dust collecting device as in claim 1, further comprising casters mounted to the case, so that the dust collecting device can move with the aid of the casters.

7. The dust collecting device as in claim 1, wherein a collecting chamber is defined within the case at a position on the lower side of the fuel cell battery assembly, and the collecting chamber is configured to be capable of storing dust and water produced by the fuel cell system.

8. The dust collecting device as in claim 1, further comprising a strap mounted to the case, so that a user can carry the dust collecting device by using the strap.

9. A dust collecting device for a power tool, comprising:
   a case;
   a fuel cell battery system including a fuel cell battery assembly and a fuel gas tank;

an AC motor capable of being electrically connected to the fuel cell battery assembly;
a suction device driven by the motor and capable of producing flow of air for collecting dust, wherein the fuel cell battery system, the motor and the suction device are assembled within the case; and
a power source circuit electrically connected between the fuel cell battery assembly and the motor via a DC/AC inverter, so that the motor is driven with supply of an electric power from the fuel cell battery assembly.

10. The dust collecting device as in claim 9, wherein:
the power source circuit includes an electric outlet mounted to the case and electrically connected to the fuel cell battery assembly via the DC/AC inverter, so that an AC power is available from the electric outlet.

11. The dust collecting device as in claim 10, the power source circuit further including a first switch operable between a first position and a second position, wherein:
when the first switch is in the first position, the AC power is supplied from the fuel cell battery assembly to the motor via the DC/AC inverter but is not supplied to the electric outlet; and
when the first switch is in the second position, the AC power is supplied from the fuel cell battery assembly to both of the motor and the electric outlet via the DC/AC inverter.

12. The dust collecting device as in claim 11, the power source circuit further including a second switch operable between a first position and a second position; wherein:
when the second switch is in the first position, the AC power can be supplied from the fuel cell battery assembly to the motor and the electric outlet via the DC/AC inverter and the first switch; and
when the second switch is in the second position, AC power is not supplied from the fuel cell battery assembly via the DC/AC inverter but can be supplied from a commercially available AC power source.

13. A dust collecting device for a power tool, comprising:
a case;
a fuel cell battery system including a fuel cell battery assembly and a fuel gas tank;
a motor capable of being electrically connected to the fuel cell battery assembly; and
a suction device driven by the motor and capable of producing flow of air for collecting dust, wherein:
the fuel cell battery system, the motor and the suction device are assembled within the case; and
the fuel cell battery system is disposed within the case at a position on the upper side of the motor.

14. A dust collecting device comprising:
a case;
a fuel cell battery system including a fuel cell battery assembly and a fuel gas tank;
a motor;
a power source circuit electrically connected between the fuel cell battery assembly and the motor;
a suction device driven by the motor and capable of producing flow of air for collecting dust; and
a mounting device capable of removably mounting a power tool to the case; wherein
the fuel cell battery system, the motor and the suction device are assembled within the case; and
the power source circuit includes an electric outlet mounted to the case and electrically connected to the fuel cell battery assembly via a DC/AC inverter, so that an AC power is available from the electric outlet.

15. The dust collecting device as in claim 14, further comprising an adaptor capable of being connected to the electric outlet and including an AC/DC converter.

16. The dust collecting device as in claim 14, wherein a cord reel is provided on the case at a position proximal to the outlet, so that a cord of an AC power tool mounted to the dust collecting device can be wound around the cord reel, while the cord is electrically connected to the outlet.

17. The dust collecting device as in claim 14, wherein the mounting device comprises:
a first device capable of preventing movement of the power tool relative to the dust collecting device in a first direction; and
a second device capable of preventing movement of the power tool relative to the dust collecting device in a second direction perpendicular to the first direction.

* * * * *